(12) United States Patent
Todokoro et al.

(10) Patent No.: US 7,607,360 B2
(45) Date of Patent: Oct. 27, 2009

(54) ADAPTOR FOR FLOW SENSOR

(75) Inventors: Noriaki Todokoro, Tokyo (JP); Isao Matsubara, Tokyo (JP); Fumihiko Takatori, Tokyo (JP)

(73) Assignee: Nihon Kohden Corporation, Tokyo (JP)

( * ) Notice: Subject to any disclaimer, the term of this patent is extended or adjusted under 35 U.S.C. 154(b) by 0 days.

(21) Appl. No.: 12/023,454

(22) Filed: Jan. 31, 2008

(65) Prior Publication Data
US 2009/0056472 A1 Mar. 5, 2009

(30) Foreign Application Priority Data
Aug. 27, 2007 (JP) ............... 2007-220154

(51) Int. Cl.
*G01F 1/42* (2006.01)
(52) U.S. Cl. .................................. 73/861.61
(58) Field of Classification Search ............. 73/861.52, 73/861.66, 861.63; 442/56
See application file for complete search history.

(56) References Cited

U.S. PATENT DOCUMENTS

| | | | |
|---|---|---|---|
| 4,932,269 A | 6/1990 | Cammarata, III et al. | |
| 5,038,773 A | 8/1991 | Norlien et al. | |
| 5,379,650 A | 1/1995 | Kofoed et al. | |
| 5,535,633 A * | 7/1996 | Kofoed et al. | 73/861.52 |
| 5,789,660 A | 8/1998 | Kofoed et al. | |
| 5,913,249 A | 6/1999 | Weckstrom | |
| 5,925,831 A * | 7/1999 | Storsved | 73/861.52 |
| 6,312,389 B1 | 11/2001 | Kofoed et al. | |
| 6,659,962 B2 | 12/2003 | Ricciardelli | |
| 2007/0274860 A1* | 11/2007 | Nakano | 422/56 |

FOREIGN PATENT DOCUMENTS

| | | |
|---|---|---|
| JP | 59-21772 U | 2/1984 |
| JP | 63-40967 Y2 | 10/1988 |
| WO | 98/41148 A1 | 9/1998 |

* cited by examiner

*Primary Examiner*—Jewel Thompson
(74) *Attorney, Agent, or Firm*—Sughrue Mion, PLLC

(57) ABSTRACT

In an adaptor for a flow sensor, a tubular body is adapted to allow respiratory gas to pass through. At least one fluid-resistant member is disposed in the tubular body. At least two pairs of first passages are formed in the fluid-resistant member and adapted to lead out pressures at two positions in the tubular body which are to be detected by the flow sensor.

16 Claims, 19 Drawing Sheets

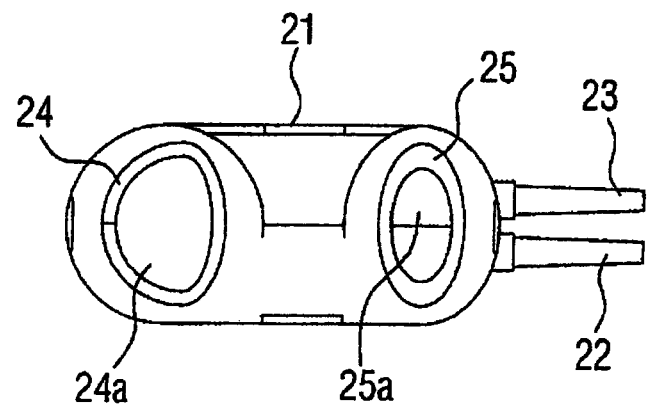
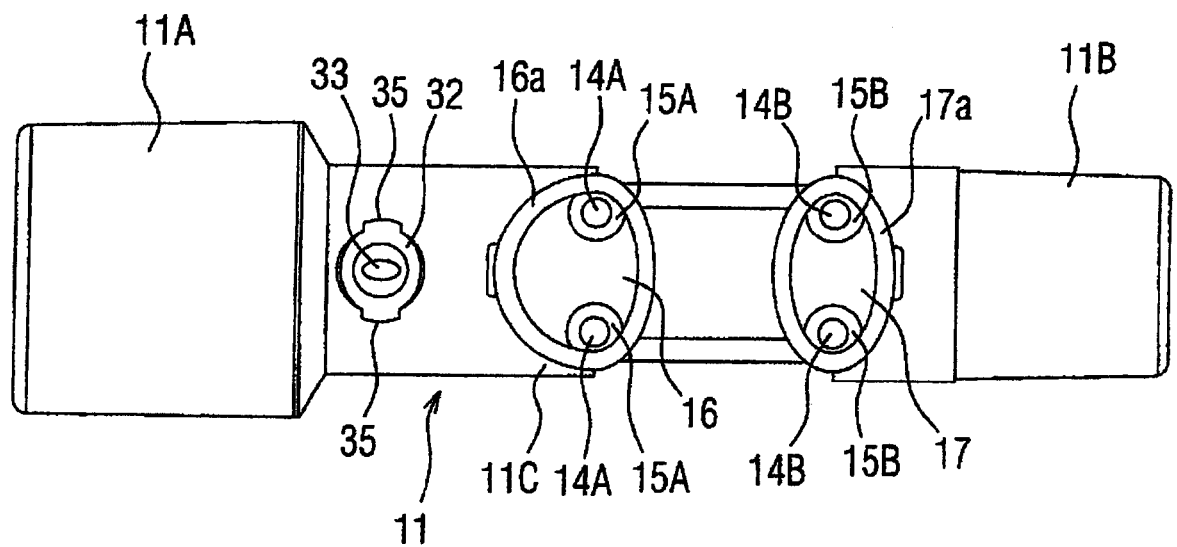

ADAPTOR FOR FLOW SENSOR

BACKGROUND

The present invention relates to an adapter for a flow sensor used to detect a respiratory flow based on a differential pressure generated between both ends of a fluid-resistant member.

As a technique for detecting a respiratory flow based on a differential pressure generated between both ends of a fluid-resistant member, for example, Japanese Utility Model Publication No. 63-40967Y discloses, as shown in FIGS. 19A to 19C and FIG. 20, a sensor 100 for detecting a composition and a flow of respiratory gas based on a differential pressure generated between front and rear ends of fluid-resistant members 102 disposed within a tubular body 101 provided with pressure detecting passages 104, wherein each of the fluid-resistant members 102 has a shape symmetrical to a plane including a line A-A' which is perpendicular to a gas flow and passing through windows 103 for measurement of $CO_2$ concentration, and the fluid-resistant members 102 are symmetrically located in the tubular body 101. For this type of detection of respiratory flow, a gas to be measured is an inspiratory gas that is humidified by a humidifier or an expiratory gas that contains vapor, and vapor of the gas to be measured is accumulated in pressure detecting passages 104 or the like, which leads to the possibility that water drops fill the pressure detecting passages 104.

To avoid such possibility, a measuring system with a purge function that spouts out water drops filling pressure detecting passages is proposed to prevent measurement errors from occurring due to such filling (see U.S. Pat. No. 6,659,962). However, the purge function of this measuring system requires components such as a pump, a reservoir and the like, which may result in increase in size and costs of the system.

Further, it is proposed a device which includes a reservoir arranged within a tubular body and purges water pooled in the tubular body from the reservoir (see U.S. Pat. No. 4,932,269). However, this document does not provide any consideration of the possibility that water drops fill pressure detecting passages.

Moreover, tubes connected to the pressure detecting passages are attached to the tubular body in a radial direction thereof. This may cause the tubes to be kinked, thereby incorrect measurement would be caused.

SUMMARY

It is therefore one advantageous aspect of the invention to provide an adaptor for a flow sensor, capable of preventing water drops from filling pressure detecting passages, thereby enabling stable continuous measurement. It is also one advantageous aspect of the invention to provide an adaptor for a flow sensor, capable of preventing tubes connected to the pressure detecting passages from being kinked, thereby enabling stable continuous measurement.

According to one aspect of the invention, there is provided an adaptor for a flow sensor, comprising:

a tubular body, adapted to allow respiratory gas to pass through;

at least one fluid-resistant member, disposed in the tubular body; and at least two pairs of first passages, formed in the fluid-resistant member and adapted to lead out pressures at two positions In the tubular body which are to be detected by the flow sensor, With this configuration, even if one pair of the first passages is filled with water drops, it is possible to make measurement in the remaining pair of the first passages.

A plurality of fluid-resistant members may be disposed along inner side walls of the tubular body.

With this configuration, it is possible to provide one pair of first passages for each fluid-resistant member and lower the possibility that the pairs of first passages are filled with water drops.

The fluid-resistant member may be formed with a window adapted to be used to measure density of gas contained in the respiratory gas.

With this configuration, the fluid-resistant member will not interrupt a light ray passing through the window.

The adaptor may further comprise a second passage, adapted to lead out the respiratory gas having a first end projected from an inner wall of the tubular body and a second end projected from an outer wall of the tubular body.

The fluid-resistant member may be disposed at a center portion of the tubular body and elongated in an axial direction of the tubular body.

With this configuration, a passage to lead out the respiratory gas to be subjected to measurement or detection may be provided with the fluid-resistant member.

The fluid-resistant member may be an ellipsoidal disk-shaped member.

With this configurations the fluid-resistant members may have a symmetrical shape as to the axial direction of the tubular body. Accordingly, it is possible to provide the first passages in a symmetrical manner, so that measurement results would be the same irrespective of an end of the tubular body from which the respiratory gas is introduced.

An outer wall of the tubular body may be formed with holes each of which is communicated with at least one of the first passages. The adaptor may further comprise reservoirs, each of which is provided on the outer wall of the tubular body, and adapted to collect water derived from vapors contained in the respiratory gas.

Each of the reservoirs may be provided between the at least one of the holes and the reservoir wall.

With this configuration, when the vapor contained in the respiratory gas becomes water drops, the water drops can be collected in the reservoirs, thereby preventing the first passage from being filled with the water drops.

The adaptor may further comprise a plurality of first joint pipes, each of which is communicated with at least one of the holes and adapted to be coupled with an external tube, the first joint pipes extending in an axial direction of the tubular body.

The adaptor may further comprise a connector attached to the tubular body and having a body monolithic with the first joint pipes.

With this configuration, it is possible to prevent the external tube from being kinked.

The adaptor may further comprise: a second passage, adapted to lead out the respiratory gas having a first end projected from an inner wall of the tubular body and a second end projected from an outer wall of the tubular body; and a second joint pipe, communicated with the second passage and adapted to be coupled with an external tube, the second joint pipe extending in an axial direction of the tubular body.

The adaptor may further comprises a connector attached to the tubular body and having a body monolithic with the first joint pipes and the second joint pipe.

The adaptor may further comprise a ridge, formed on the inner wall of the tubular body so as to be continued from the first end of the second passage and extended in an axial direction of the tubular body. An end of the ridge in the axial direction of the tubular body and the first end of the second passage may have the same shape.

With this configuration, it is possible to prevent a flow of fluid in the tubular body from being unbalanced by the first end of the second passage, so that measurement results would be the same irrespective of an end of the tubular body from which the respiratory gas is introduced.

The adaptor may further comprise walls, each of which surrounds one of the holes. A top end of each of the walls may be higher than a bottom of each of the reservoirs.

With this configuration, water collected in the reservoirs hardly flows into the holes.

According to the invention, there is also provided a connector, comprising:

a body, adapted to be attached to a tubular body of an adaptor for a flow sensor;

a plurality of first joint pipes, each of which is adapted to be coupled with an external tube, and communicated, when the connector is attached to the tubular body, with at least one of holes each of which is formed on the tubular body and communicated with at least one of first passages formed in a fluid-resistant member disposed in the tubular body for leading out pressures at two positions in the tubular body, wherein:

the first joint pipes extend in an axial direction of the tubular body when the connector is attached to the tubular body; and the body and the first joint pipes are monolithic.

The connector may further comprise a second joint pipe, adapted to be coupled with an external tube, and communicated, when the connector is attached to the tubular body, with a second passage provided with the tubular body for leading out respiratory gas. The second joint pipe may extend in the axial direction of the tubular body when the connector is attached to the tubular body. The body and the second joint pipe may be monolithic.

BRIEF DESCRIPTION OF THE DRAWINGS

FIG. 2A is a bottom view of a connector of the adaptor of FIG. 1.

FIG. 2B is a top view of a tubular body of the adaptor of FIG. 1.

DETAILED DESCRIPTION OF EXEMPLARY EMBODIMENTS

Figure 1:
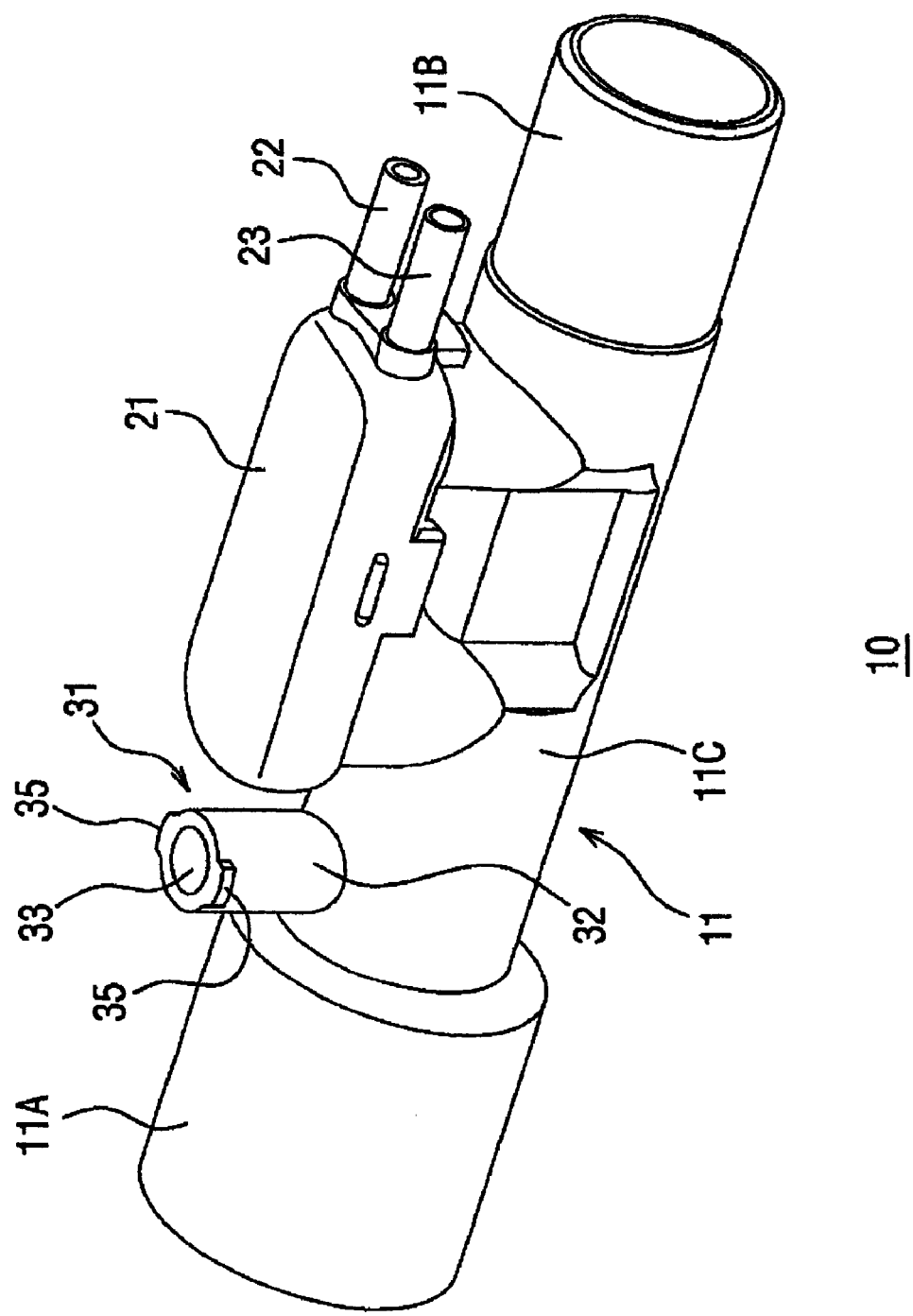
FIG. 1 is a perspective view of an adaptor for a flow sensor, according to a first embodiment of the invention.
Figure 3:
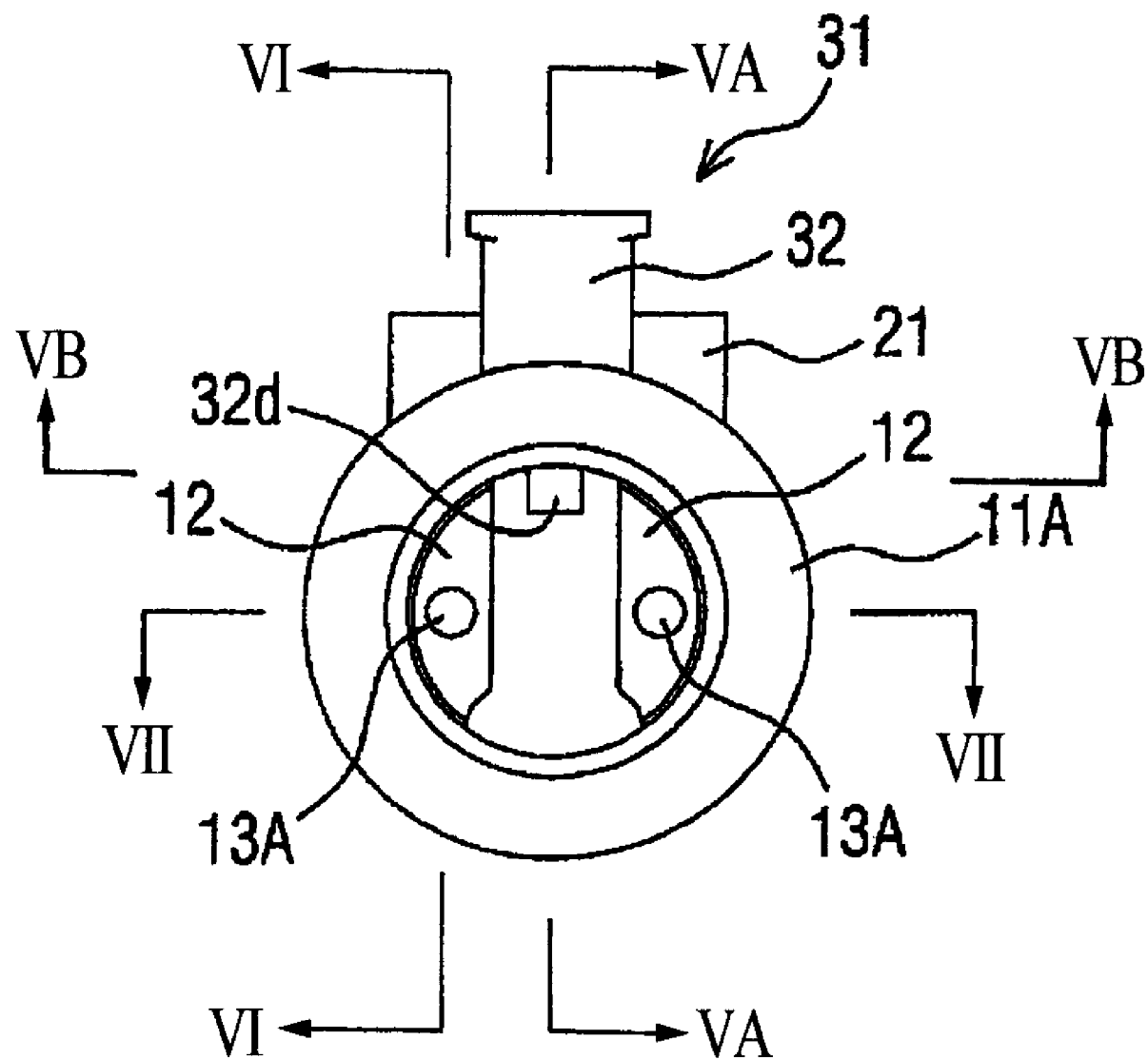
FIG. 3 is a front view of the adaptor of FIG. 1.
Figure 4:
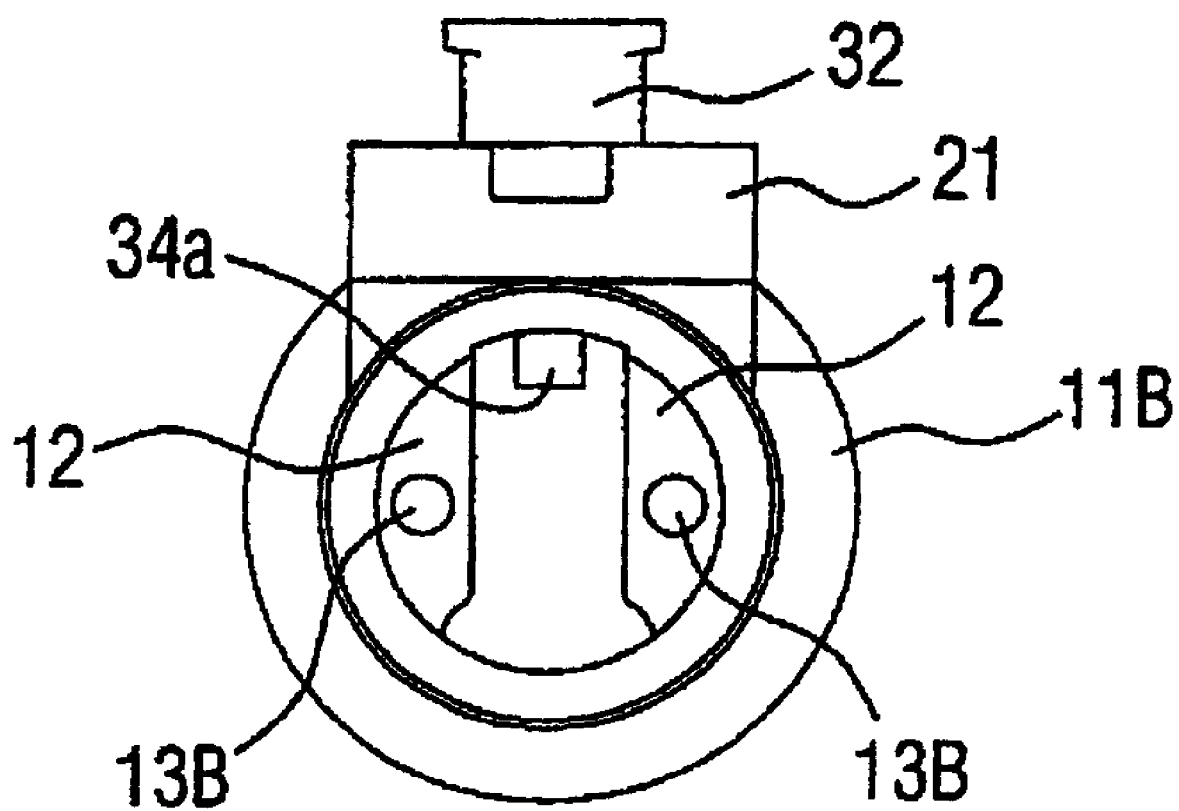
FIG. 4 is a rear view of the adaptor of FIG. 1.

Exemplary embodiments of the invention will be described below in detail with reference to the accompanying drawings. Throughout the drawings, similar components are denoted by the same reference numerals, and repetitive explanations for those will be omitted.

FIGS. 1 through 7 show an adaptor 10 for a flow sensor according to a first embodiment of the invention. The adaptor 10 includes a tubular body 11 having a central portion 11C which is longer than other portions, a large-diameter portion 11A formed at a front end of the central portion 11C, and a small-diameter portion 11B formed at a rear end of the central portion 11C. The large-diameter portion 11A is a portion which is adapted to be close to a mouth of a subject and into which an expiratory gas flows.

Stationary fluid-resistant members 12 having the same almost ellipsoidal shape are formed at both sides of an inner wall of the central portion 11C. Pressure detecting passages 13A are respectively formed at ends close to the large-diameter portion 11A of the fluid-resistant members 12, and pressure detecting passages 13B are respectively formed at ends close to the small-diameter portion 11B of the fluid-resistant members 12. The pressure detecting passages 13A extend in the axial direction of the tubular body 11 and bent upward perpendicularly to be communicated with exit ports 14A formed at the top side of the tubular body 11. The pressure detecting passages 13B extend in the axial direction of the tubular body 11 and bend upward perpendicularly to be communicated with exit ports 14B formed at the top side of the tubular body 11.

The pressure detecting passages 13A and 13B are two-paired, each pair being arranged at each fluid-resistant member 12. The exit ports 14A are surrounded by exit walls 15A. Similarly, ends of the exit ports 14B are surrounded by exit walls 15B.

The exit walls 15A are surrounded by a reservoir wall 16a of a water reservoir 16 higher than the exit walls 15A, and the exit walls 15B are surrounded by a reservoir wall 17a of a water reservoir 17 higher than the exit walls 15B. The exit walls 15A and 15B are respectively located higher than the bottom of the water reservoir 16 and 17. Accordingly, vapor of an expiratory gas introduced into the exit walls 15A and 15B via the pressure detecting passages 13A and 13B and the exit ports 14A and 14B in the tubular body 11 is accumulated into water drops to be pooled in the water reservoirs 16 and 17. Since the water level does not reach the tops of the exit walls 15A and 15B as long as a lot of water drops are not accumulated into the water reservoirs 16 and 17, and water accumulated into the water reservoirs 16 and 17 hardly flows into the exit ports 14A and 14B.

A connector 21 is placed on the water reservoirs 16 and 17, and has joint pipes 22 and 23 extending in parallel to the tubular body 11. Thus, since it is possible to prevent tubes coupled to the joint pipes 22 and 23 from being kinked, stable continuous measurement can be performed.

A hole of the joint pipe 22 passes through the connector 21 and is led into a space 24a defined by a coupler 24 having a shape to be fitted with an inner periphery of the reservoir wall 16a. A hole of the joint pipe 23 passes through the connector 21 and is led into a space 25a defined by a coupler 26 having a shape to be fitted with an inner periphery of the reservoir wall 17a. Accordingly, an expiratory gas introduced into the exit walls 15A reaches the hole of the joint pipe 22 via a hole in the connector 21 from the water reservoir 16 and the space 24a. Also, an expiratory gas introduced into the exit walls 15B reaches the hole of the joint pipe 23 via the hole in the connector 21 from the water reservoir 17 and the space 25a. In this manner, two pairs of pressure detecting passages 13A and 13B are gathered and communicated with the exit ports 14A and 14B, and further communicated with the joint pipes 22 and 23 by way of the connector 21.

A gas detecting passage 31 for leading out a gas in the tubular body 11 is formed in the reservoir wall 16a of the water reservoir 16 and a portion where the large-diameter portion 11A is jointed to the central portion 11C. The gas detecting passage 31 has a coupler 32 projected from the tubular body 11. A hole 33 communicating to the inside of the tubular body 11 is formed in the coupler 32.

Figure 5A:
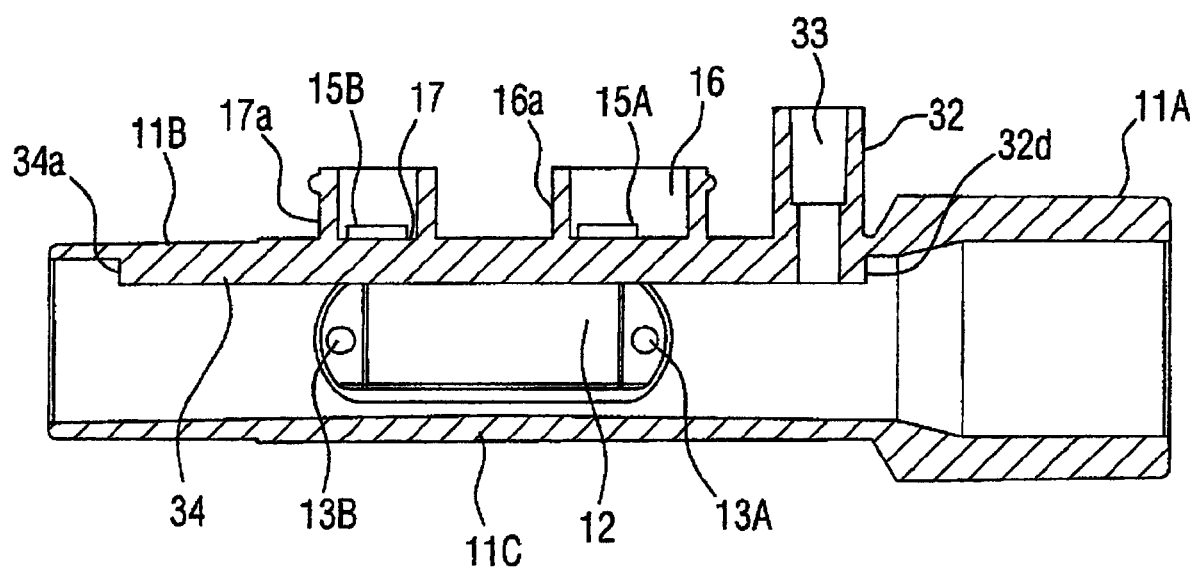
FIG. 5A is a section view of the adaptor of FIG. 1, taken along a line VA-VA in FIG. 3.
Figure 5B:
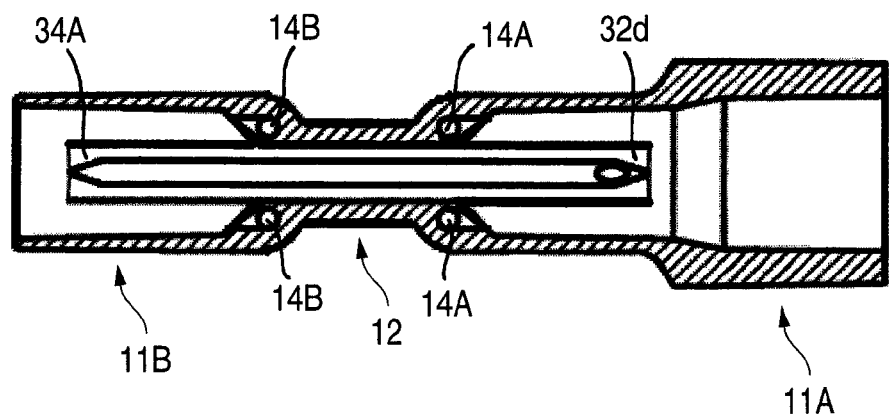
FIG. 5B is a section view of the adaptor of FIG. 1, taken along a line VB-VB in FIG. 3.

A lower end 32d of the coupler 32 projects into the tubular body 11. In order to maintain symmetry of a passage in the tubular body 11, a ridge 34 is formed so as to extend from the lower end 32d of the coupler 32 to a ceiling part of an inner wall of the small-diameter portion 11B. As shown in FIG. 5B, a side end 34a of the ridge 34 and the lower end 32d of the coupler 32 are narrowed so as to be pointed in order to cause water drops to move smoothly. The side end 34a and the lower end 32d may be narrowed so as to be rounded.

Figure 8:
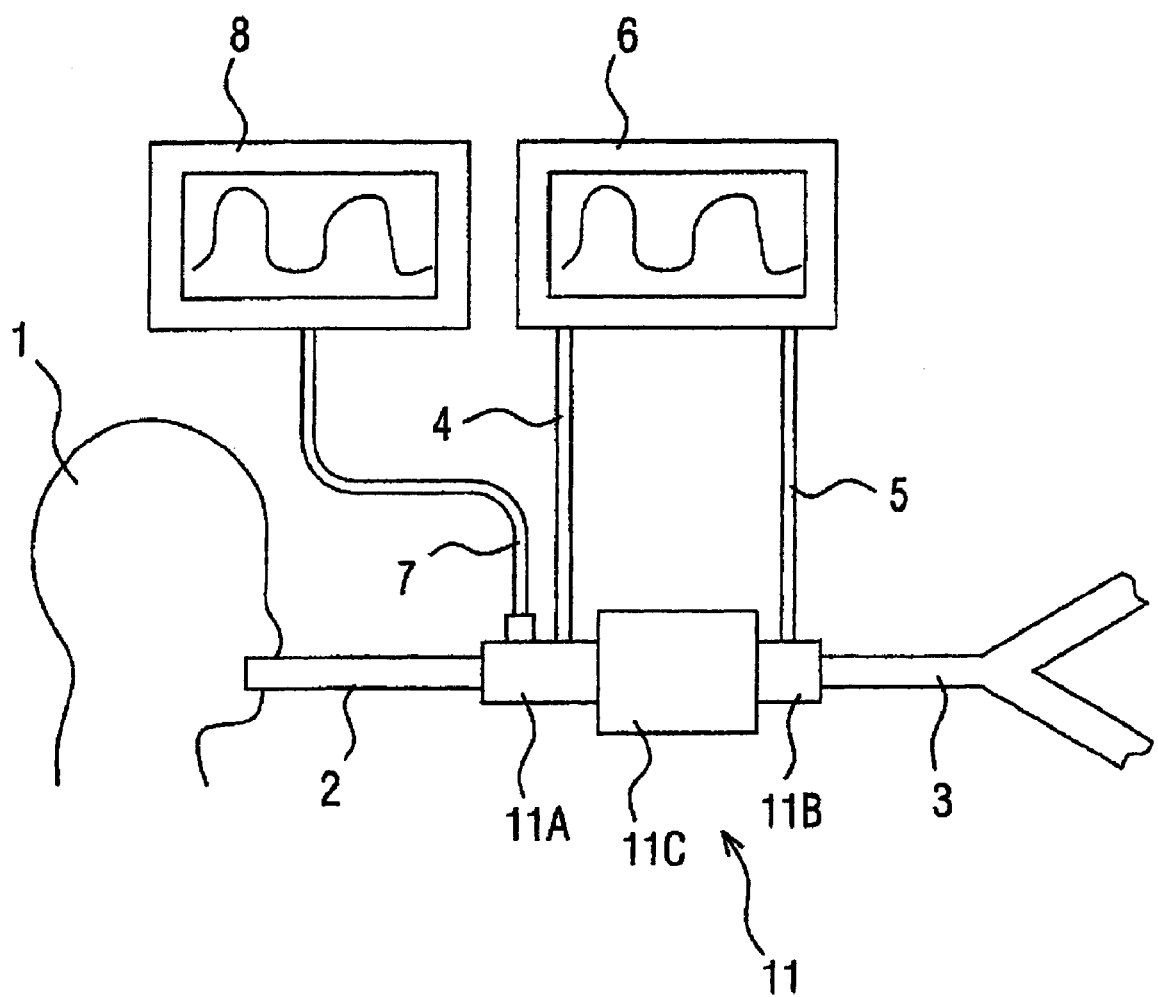
FIG. 8 is a schematic view explaining how to use the adaptor of FIG. 1.

The hole 33 is configured to be directed upward in a normal use as shown in FIG. 8. However, the hole 33 would be directed downward due to an accidental movement of the flow sensor adapter during an operation and condensed water drops would move inside the tubular body 11. Even in such a situation, the water drops hardly enter the gas detecting passage 31 because the water drops would be blocked by the ridge 34 and the lower end 32d of the coupler 32 which are protruded from the inner face of the tubular body 11.

A top end of the coupler 32 has a circle shape and includes two stoppers 35 projecting in the radial direction thereof. A connector of a tube to be jointed to the coupler 32 has an end opening formed with notches so as to have a shape corresponding to the top end of the coupler 32, and an inner portion of the connector closer to the tube than the opening has a cylindrical shape. Accordingly, by positioning the end opening of the connector at the top end of the coupler 32, inserting the top end of the coupler 32 into the connector while aligning the stoppers with the notches, and rotating the connector, the stoppers 35 are prevented from being leaked from the opening of the connector.

The adaptor 10 as constructed above is used as shown in FIG. 8, for example. An endotracheal tube 2 is connected to the large-diameter portion 11A and is inserted into a trachea of a subject 1 through a mouth of the subject 1. A tube 3 leading to, for example, a respirator is connected to the small-diameter portion 11B. A tube 4 is connected to the joint pipe 22 and a tube 5 is connected to the joint pipe 23. The tubes 4 and 5 are connected to a respiration monitor 6 having a differential pressure gauge. A tube 7 is connected to the gas detecting passage 31 and a side-stream type gas monitor 8 having a gas densitometer for measuring density of a carbon dioxide gas or the like.

As the subject 1 breathes, a pressure by a fluid flowing into the adaptor 10 reaches the differential pressure gauge of the respiration monitor 6 via the tubes 4 and 5, and the differential pressure gauge obtains a flow to be displayed on the respiration monitor 6. The gas densitometer detects density of a carbon dioxide gas or the like obtained through the tube 7, and the detected density is displayed on the gas monitor 8.

In the above measurement, since accumulated water drops are pooled in the water reservoirs 16 and 17, the exit ports 14A and 14B and so on are hardly filled. Even if one pair of pressure detecting passages 13A and 13B is filled, the remaining pair of pressure detecting passages 13A and 13B is hardly filled, thereby allowing continuous and stable measurement.

Figure 6:
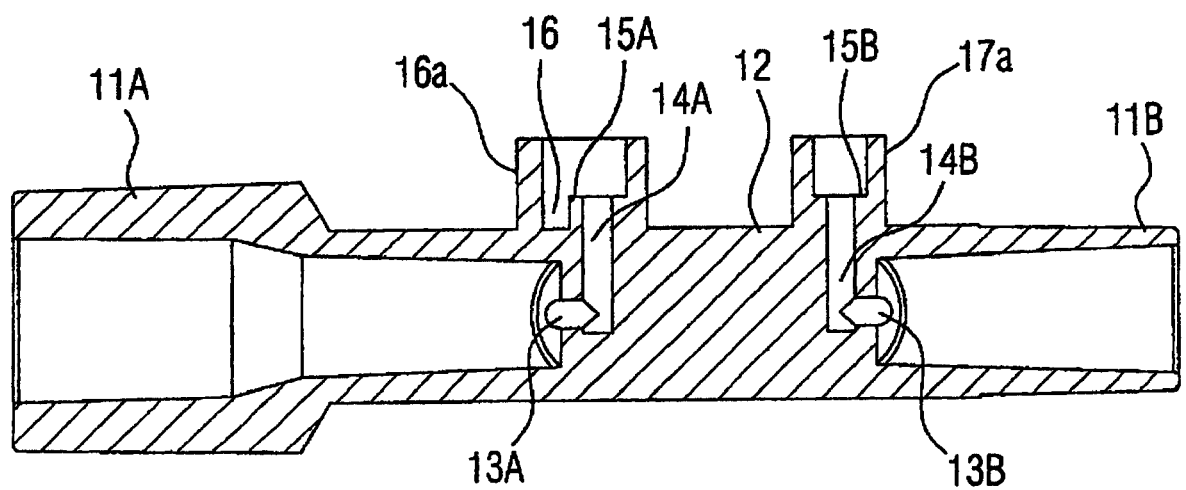
FIG. 6 is a section view of the adaptor of FIG. 1, taken along a line VI-VI in FIG. 3.
Figure 7:
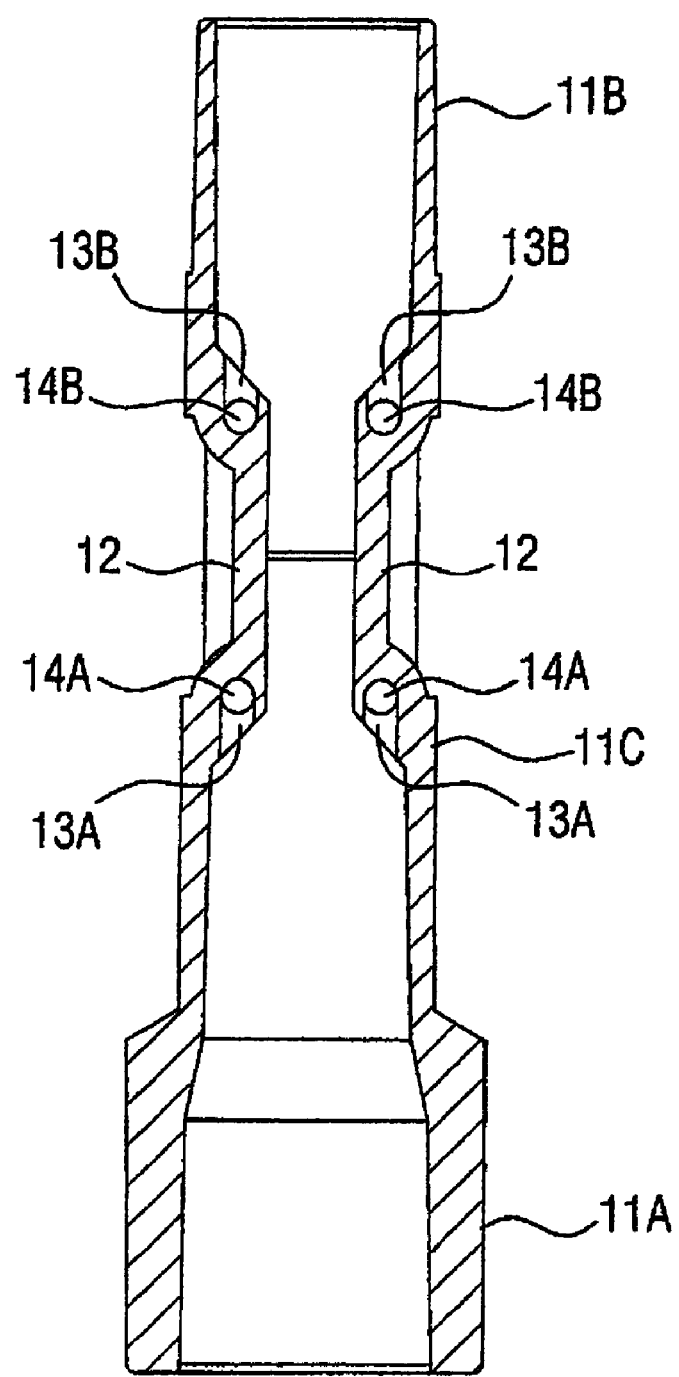
FIG. 7 is a section view of the adaptor of FIG. 1 taken along a line VII-VII in FIG. 3.
Figure 9:
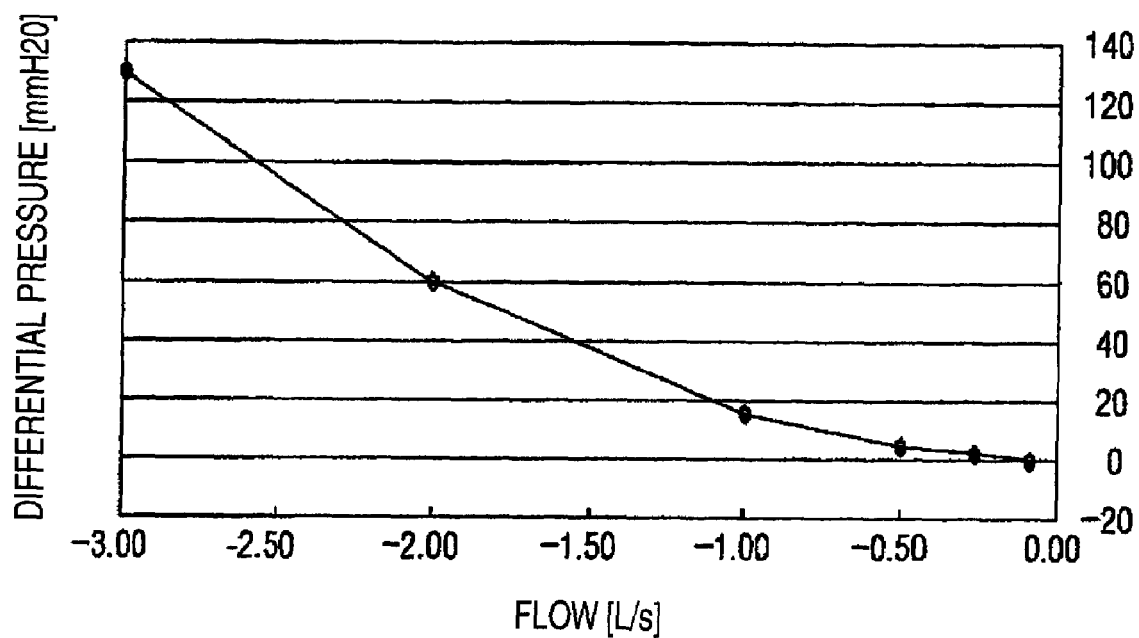
FIG. 9 is a graph showing flow-differential pressure characteristics obtained by the adaptor of FIG. 1.

In FIG. 9, a blank lozenge mark represents a reference condition that two pairs of pressure detecting passages 13A and 13B are not filled; a blank square mark represents a condition that one pair of pressure detecting passages 13A and 13B shown in the right side of FIG. 6 is filled; and a blank triangle mark represents that another pair of pressure detecting passages 13A and 13B shown in the left side of FIG. 6 is filled. The obtained flow-differential pressure characteristics have almost no difference. This means stable continuous measurement can be performed.

Although one pair of pressure detecting passages 13A and 13B is provided for each fluid-resistant member 12 in this embodiment, two or more pairs of pressure detecting passages 13A and 13B may be provided for each fluid-resistant member 12.

Figure 10:
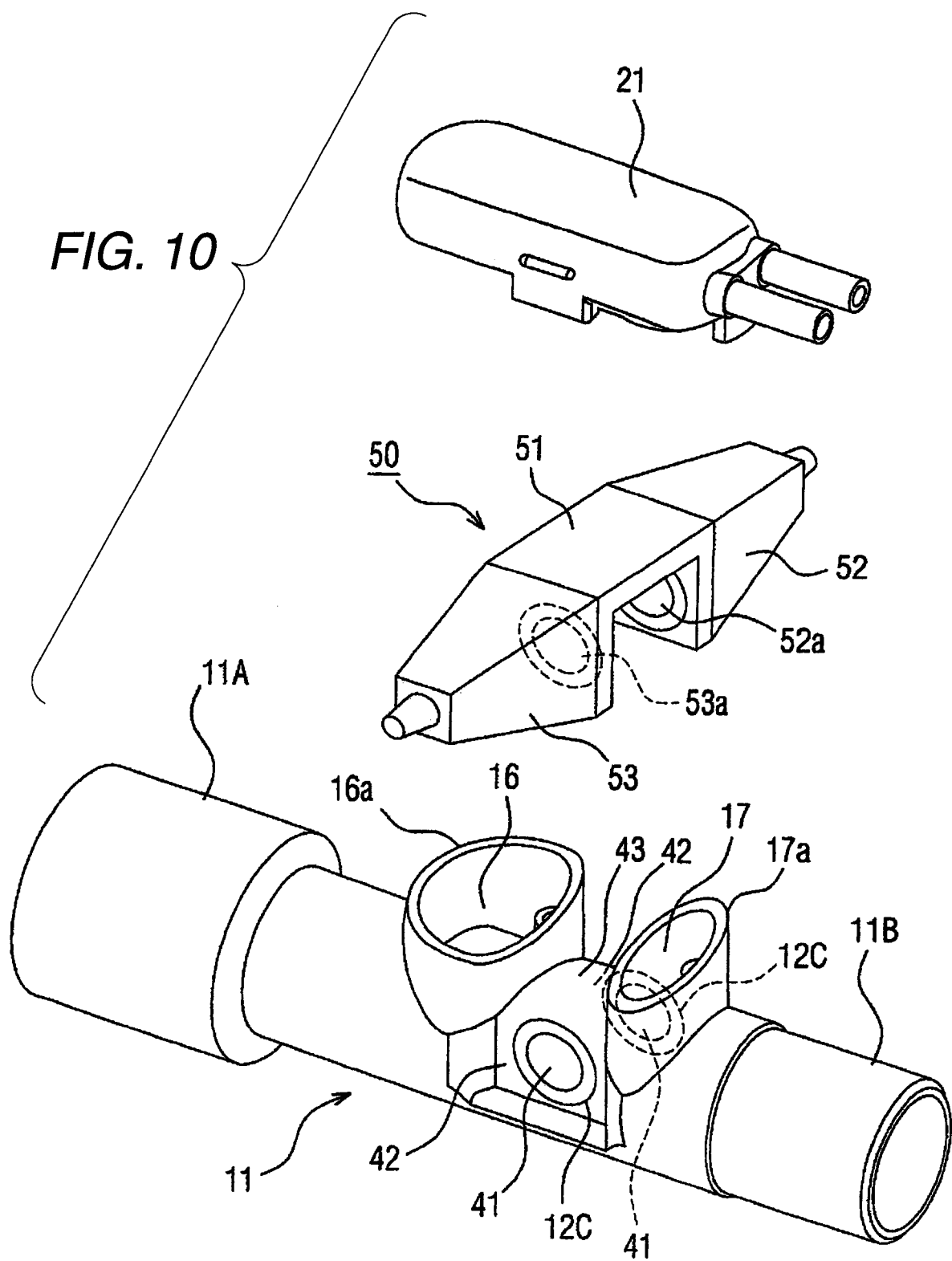
FIG. 10 is a perspective view of a disassembled state of an adaptor for a flow sensor according to a second embodiment of the invention.

FIG. 10 shows an adaptor 10A for a flow sensor according to a second embodiment of the invention. The adaptor 10A is provided with transparent windows 41 in central portions 12C of fluid-resistant members 12, respectively. That is, the transparent windows 41 for measuring density of a carbonic acid gas or an anesthetic gas in the tubular body 11 are arranged in narrowed portions 42 located on the lateral side of the tubular body 11 and between the reservoir wall 16a of the water reservoir 16 and the reservoir wall 17a of the water reservoir 17.

A back portion 43 for positioning a bridge 51 of a gas sensor 50 is provided between the reservoir wall 16a of the water reservoir 16 and the reservoir wall 17a of the water reservoir 17. When the bridge 51 of the gas sensor 50 is fitted to the back portion 43, a light receiving surface 52a of a light receiving element 52 is in opposite to a light emitting surface 53a of a light emitting element 53 through the transparent windows 41. With the gas sensor 50 combined to the adaptor 10A, the couplers 24 and 25 of the connector 21 are fitted from upper sides of the reservoir wall 16a of the water reservoir 16 and the reservoir wall 17a of the water reservoir 17, thereby allowing a differential pressure to be led out from the joint pipes 22 and 23. The adaptor 10A of this embodiment does not comprise the gas detecting passage 31 of the adaptor 10 of the first embodiment.

Figure 11:
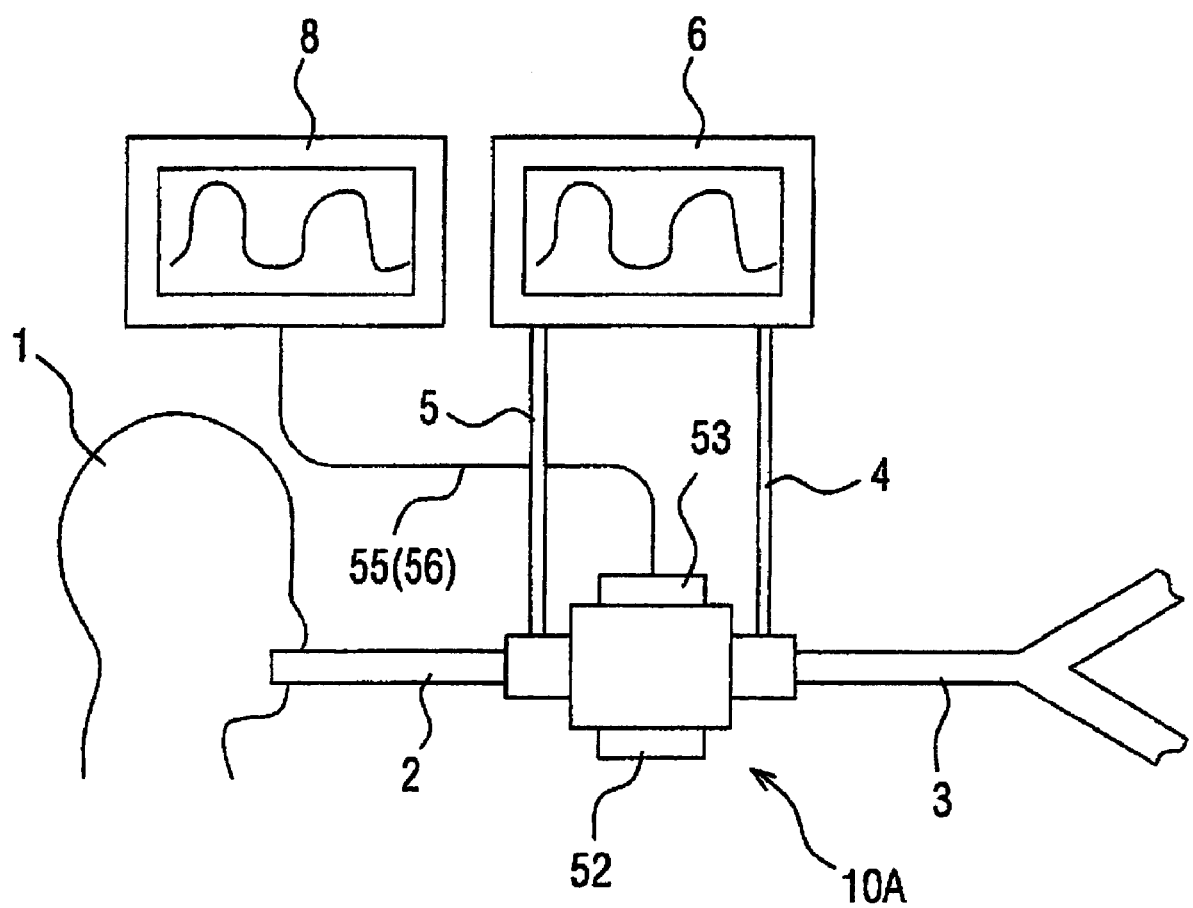
FIG. 11 is a schematic view explaining how to use the adaptor of FIG. 10.

The adaptor 10A as constructed above is used as shown in FIG. 11, for example. A measurement system shown in FIG. 11 has basically the same configuration as the measurement system of FIG. 8 except that the light receiving element 52 and the light emitting element 53 are connected to the gas monitor 8 via leads 55 and 56. A light emitting instruction signal is sent to the light emitting element 53 via the lead 56, and a light receiving signal is sent from the light receiving element 52 to the gas monitor 8 via the lead 55. A detected flow is displayed on the respiration monitor 6, and a detected gas density is displayed on the gas monitor 8. With this configuration, it is possible to measure the gas density without leading out a gas through a tube.

Figure 12:
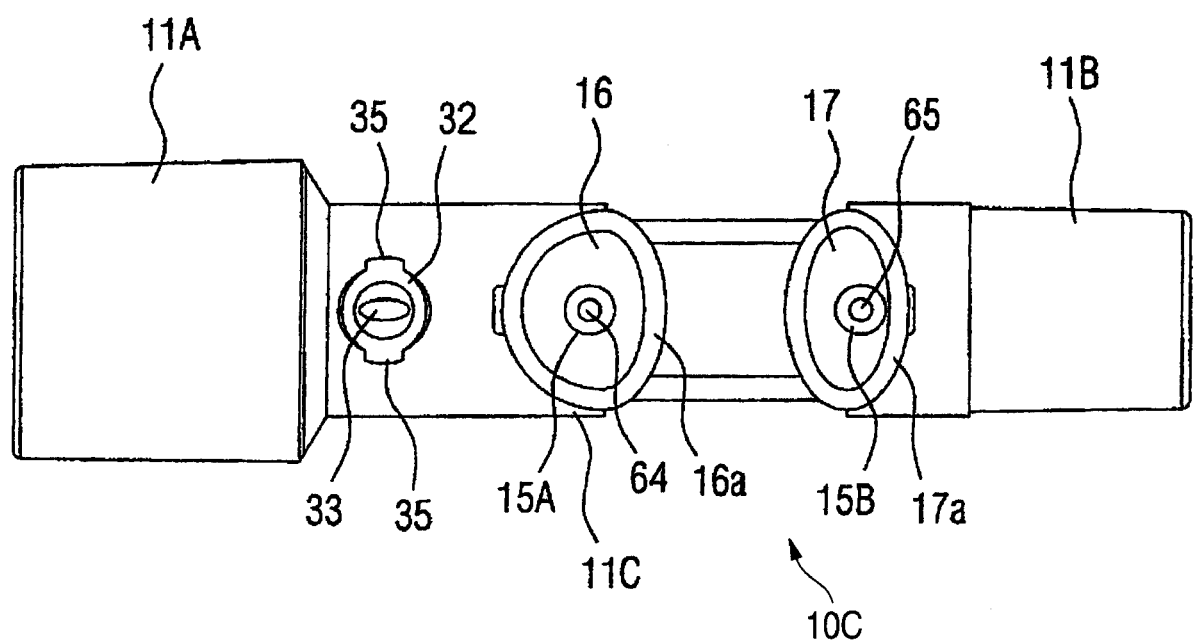
FIG. 12 is a top view of a tubular body of an adaptor for a flow sensor according to a third embodiment of the invention.
Figure 13:
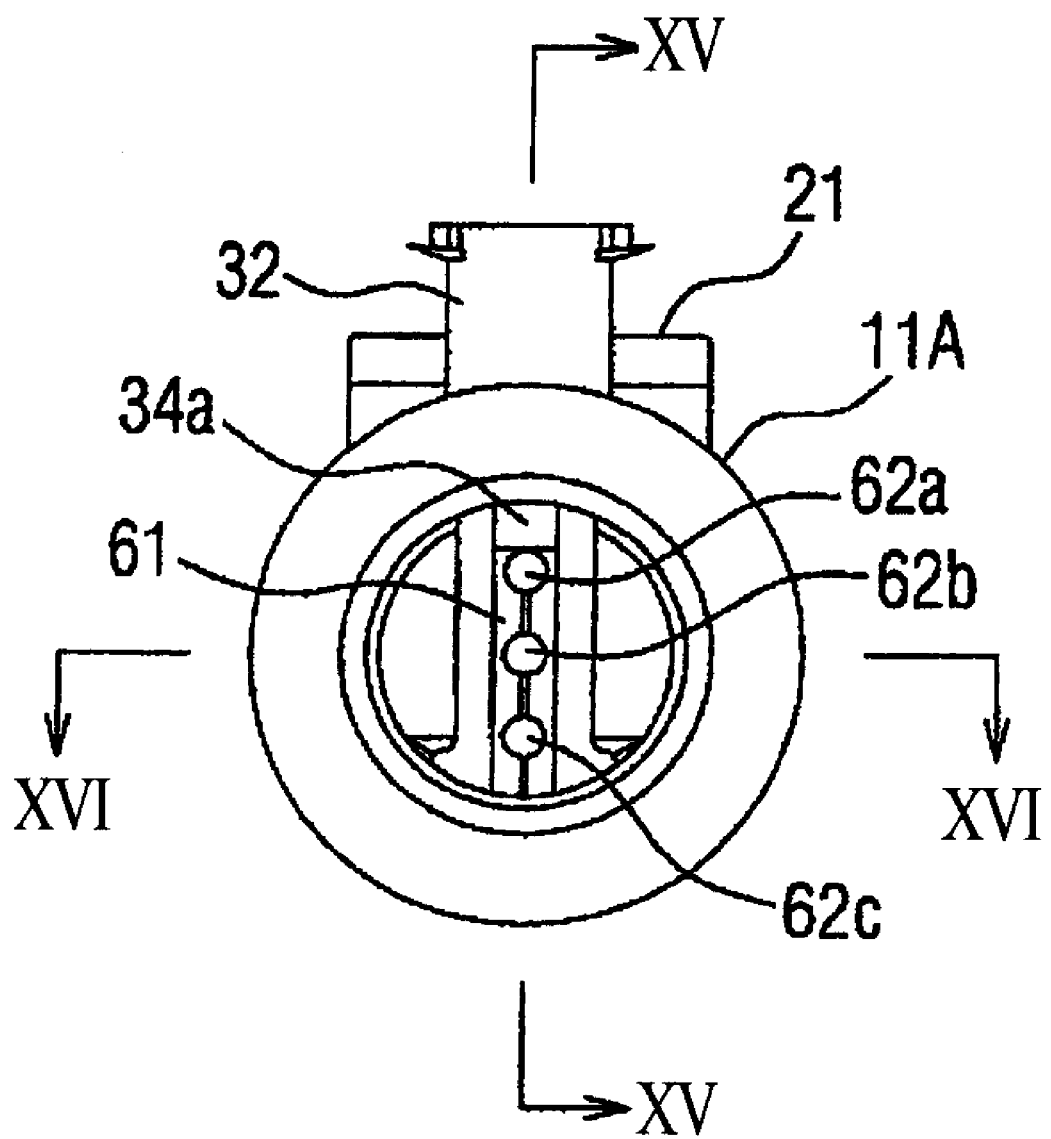
FIG. 13 is a front view of the adaptor of FIG. 12.
Figure 14:
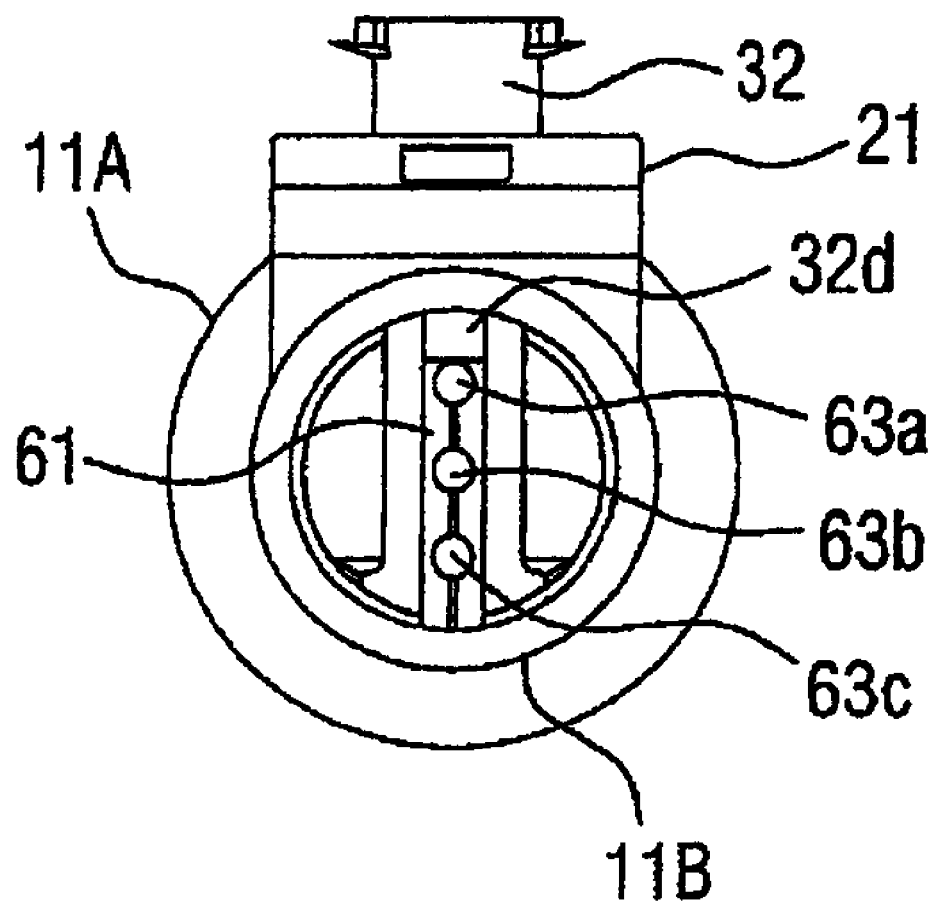
FIG. 14 is a rear view of the adaptor of FIG. 12.

FIGS. 12 though 16 show an adaptor 100 according to a third embodiment of the invention. In this embodiment, a flat fluid-resistant member 61 is formed in a central portion of the tubular body 11 and elongated in the axial direction of the tubular body 11. A front end and a rear end of the fluid-resistant member 61 are tapered. Pressure detecting passages 62a, 62b and 62c are vertically arrayed in the front end of the fluid-resistant member 61, and pressure detecting passages 63a, 63b and 63c are vertically arrayed in the rear end of the fluid-resistant member 61.

The pressure detecting passages 62a, 62b and 62c extend in the axial direction of the tubular body 11, and bent upward perpendicularly to be communicated with an exit port 64 formed at the top side of the tubular body 11. The pressure detecting passages 63a, 63b and 63c extend in the axial direction of the tubular body 11, and bent upward perpendicularly to be communicated with an exit port 65 formed at the top side of the tubular body 11. Any other configurations of the adaptor of this embodiment is the same as those of the first embodiment. The connector 21 is placed in the same way as in the first embodiment. Accordingly, dew water drops are accumulated into the water reservoirs 16 and 17. Since the lower sides of the water reservoirs 16 and 17 are lower than the exit walls 15A and 15B, water drops hardly flows into the exit ports 64 and 65.

Figure 15:
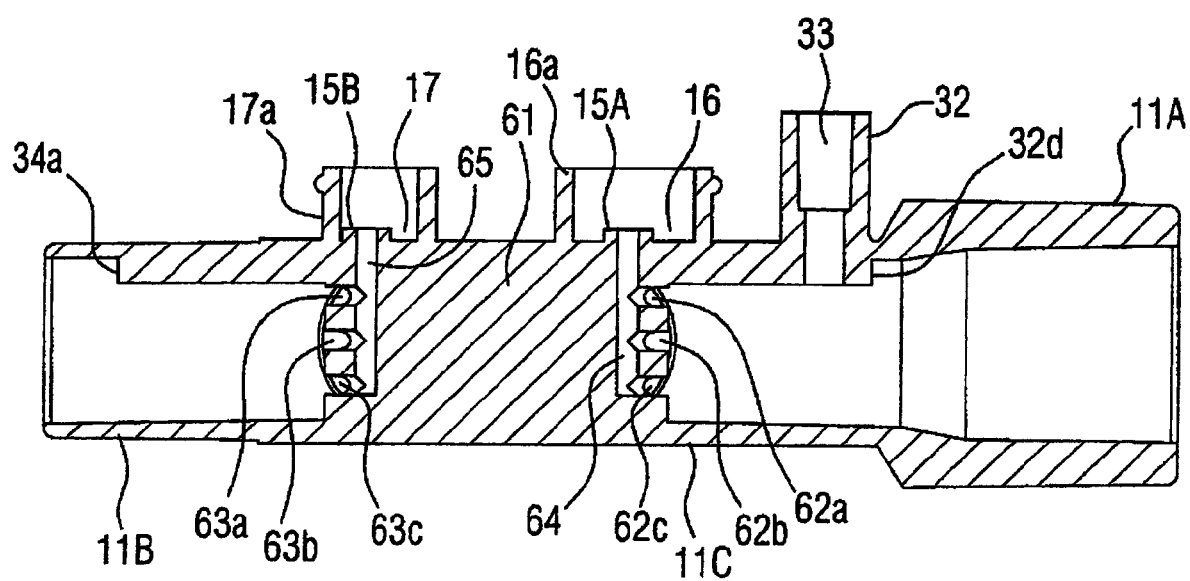
FIG. 15 is a section view of the adaptor of FIG. 11 taken along a line XV-XV in FIG. 13.
Figure 16:
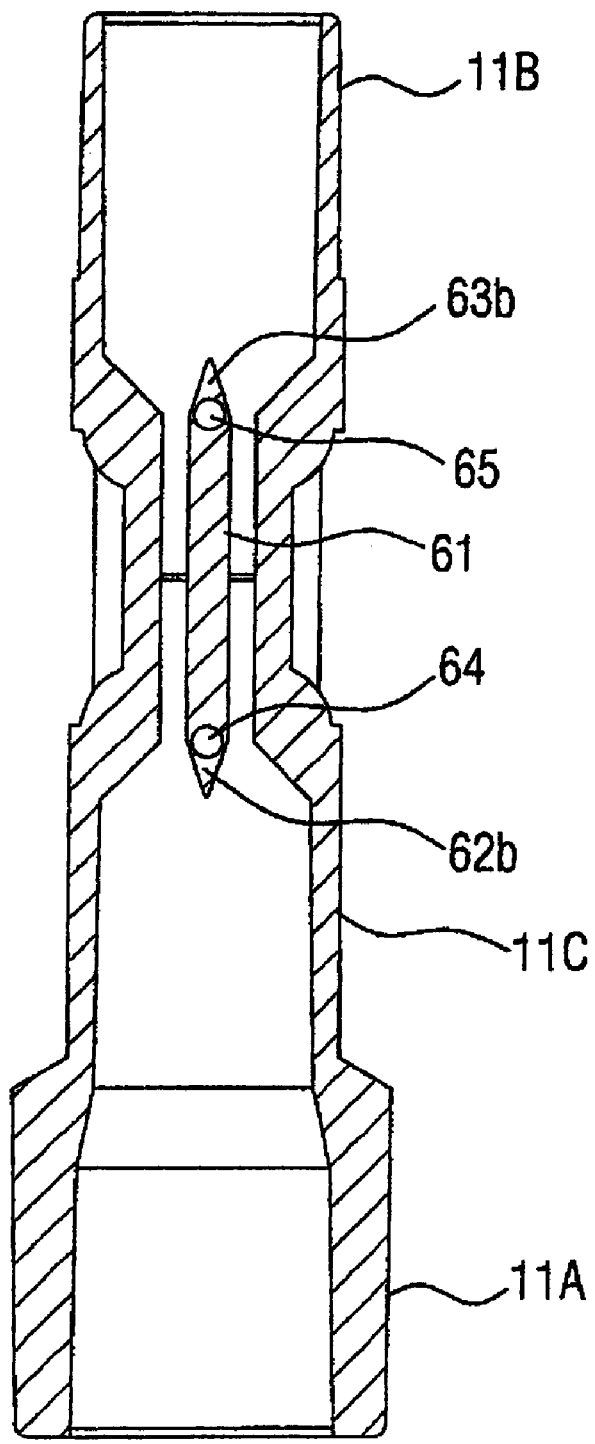
FIG. 16 is a section view of the adaptor of FIG. 11, taken along a line XVI-XVI in FIG. 13.

In addition, since three pairs of pressure detecting passages 62a, 62b and 62c; and 63a, 63b and 63c are vertically arrayed, even if water enters the exit ports 64 and 65, the water is discharged from the pressure detecting passages 62c, 63c located at the lowest side when the adaptor 10C is used in the state shown in FIG. 15. Therefore, stable continuous measurement can be performed without filling the exit ports 64 and 65.

Figure 17:
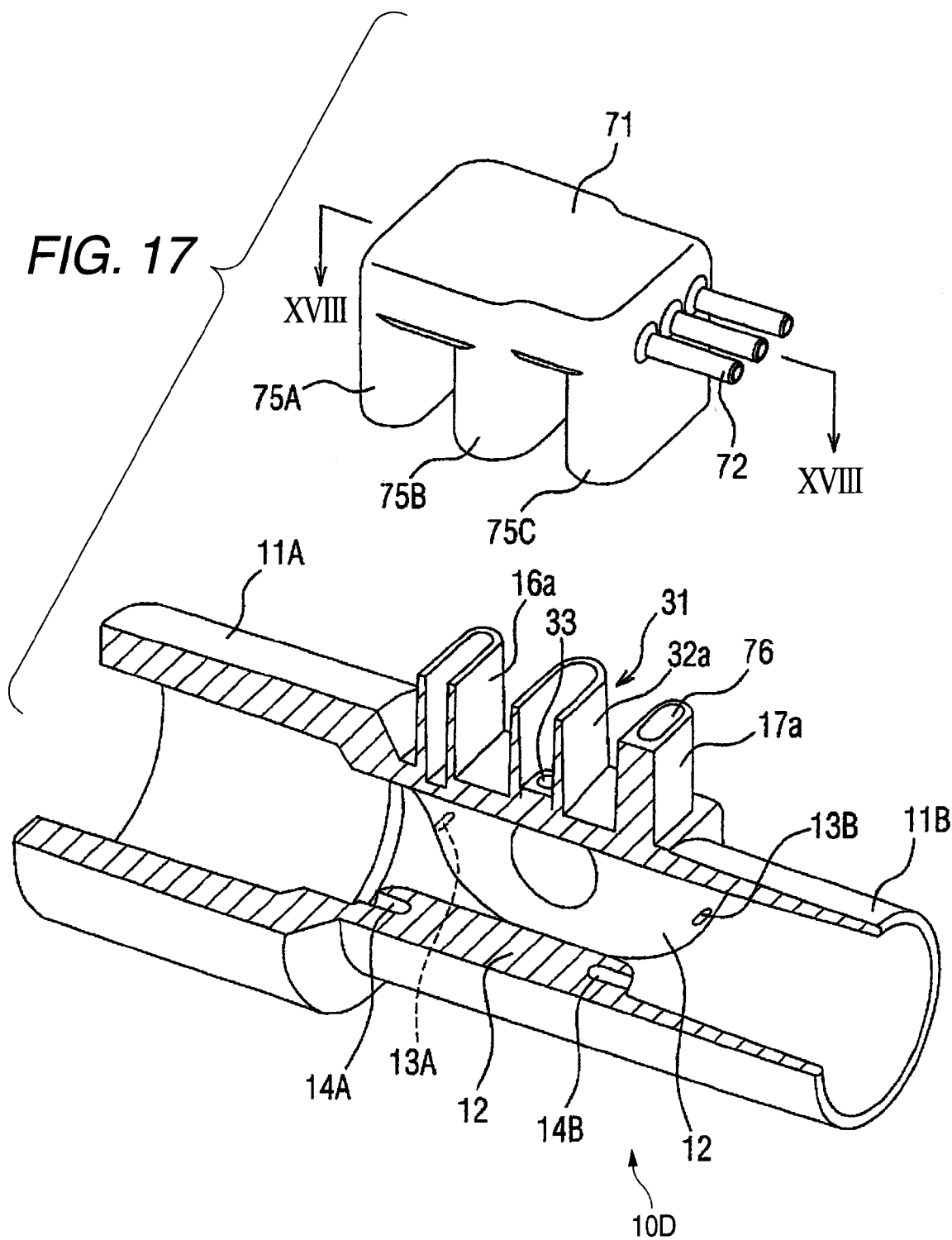
FIG. 17 is a partially-sectioned perspective view of a disassembled state of an adaptor for a flow sensor according to a fourth embodiment of the invention.
Figure 18:
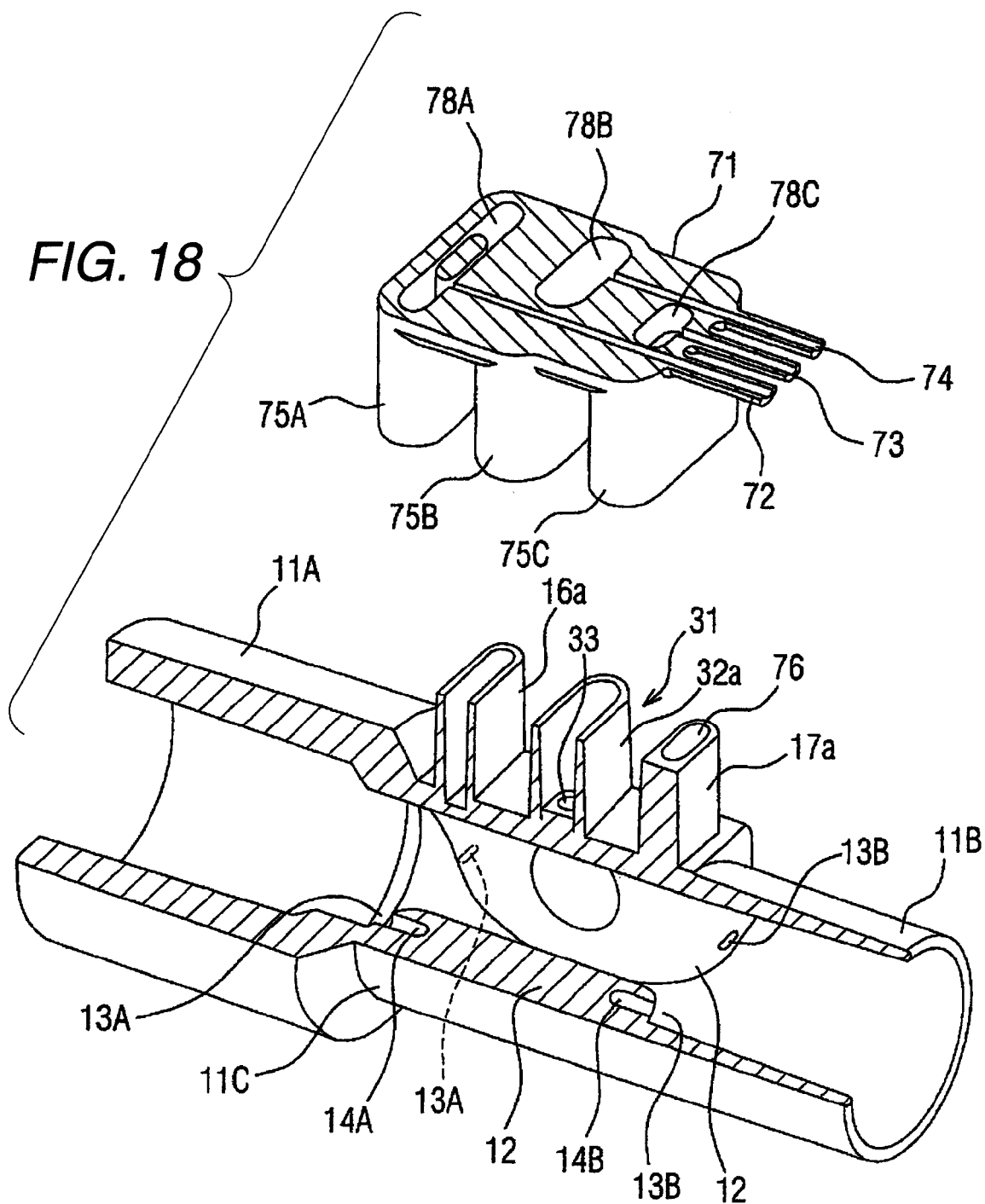
FIG. 18 is a section view of the adaptor of FIG. 17, taken along a line XVIII-XVIII in FIG. 17.
Figure 19A:
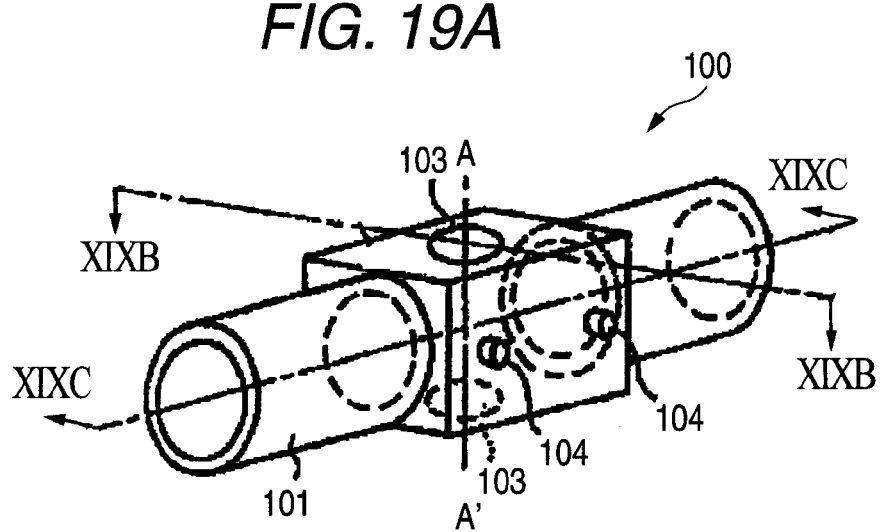
FIG. 19A is a perspective view of a conventional adaptor for a flow sensor.
Figure 19B:
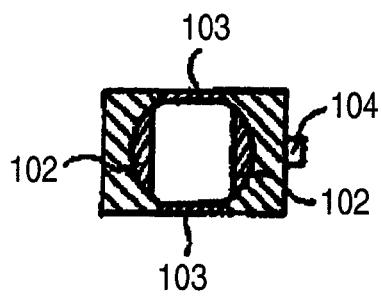
FIG. 19B is a section view of the conventional adaptor, taken along a line XIXB-XIXB in FIG. 19A.
Figure 19C:
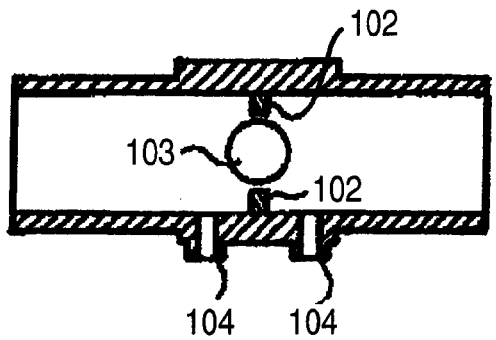
FIG. 19C is a section view of the conventional adaptor, taken along a line XIXC-XIXC in FIG. 19A.
Figure 20:
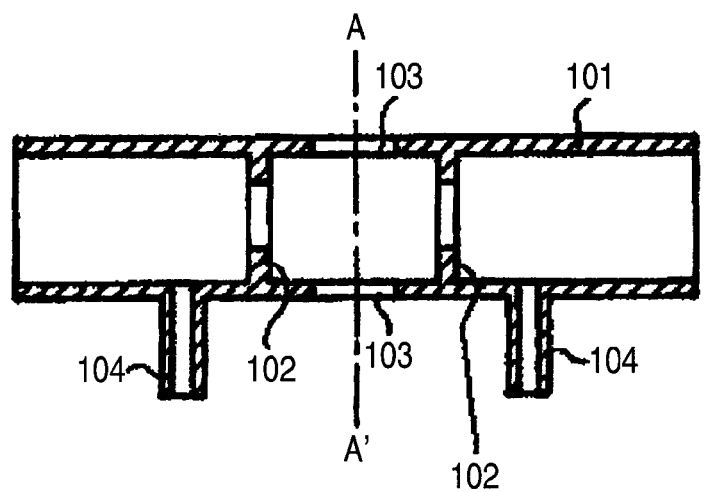
FIG. 20 is a section view of another conventional adaptor.

FIGS. 17 and 18 show an adaptor 10D according to a fourth embodiment of the invention. The adaptor of this embodiment has basically the same configuration as the adaptor of the first embodiment except that the gas detecting passage 31 is disposed between the reservoir wall 16a of the water reservoir 16 and the reservoir wall 17a of the water reservoir 17.

A connector 71 has joint pipes 72, 73 and 74. The reservoir wall 16a and the reservoir wall 17a are inserted into coupling sections 75A and 75C formed in the connector 71. The exit walls 15A are arranged in the reservoir wall 16a. The reservoir wall 17a has two holes 76 corresponding to the exit walls 15B.

The two holes 76 are connected to a chamber 78C communicated with the joint pipe 73. The water reservoir 16 is connected to a chamber 78A of the connector 71 communicated with the joint pipe 72. A coupler 32a is connected to a chamber 78B of the connector 71 communicated with the joint pipe 74. The fluid-resistant member 12 has a transparent window 41.

With this configuration, it is possible to obtain the same advantages as those obtained by the adapter of the first embodiment.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2007-220154 filed Aug. 27, 2007 including specification, drawings and claims is incorporated herein by reference in its entirety.

What is claimed is:

1. An adaptor for a flow sensor, comprising:
   a tubular body, adapted to allow respiratory gas to pass through;
   at least one fluid-resistant member, disposed in the tubular body; and
   at least two pairs of first passages, formed in the fluid-resistant member and adapted to lead out pressures at two positions in the tubular body which are to be detected by the flow sensor.

2. The adaptor as set forth in claim 1, wherein:
   a plurality of fluid-resistant members are disposed along inner side walls of the tubular body.

3. The adaptor as set forth in claim 1, wherein:
   the fluid-resistant member is formed with a window adapted to be used to measure density of gas contained in the respiratory gas.

4. The adaptor as set forth in claim 1, further comprises:
   a second passage, adapted to lead out the respiratory gas having a first end projected from an inner wall of the tubular body and a second end projected from an outer wall of the tubular body.

5. The adaptor as set forth in claim 1, wherein:
   the fluid-resistant member is disposed at a center portion of the tubular body and elongated in an axial direction of the tubular body.

6. The adaptor as set forth in claim 1, wherein:
   the fluid-resistant member is an almost ellipsoidal disk-shaped member.

7. The adaptor as set forth in claim 1, wherein:
   an outer wall of the tubular body is formed with holes each of which is communicated with at least one of the first passages; and
   the adaptor further comprises reservoirs, each of which is provided on the outer wall of the tubular body, and adapted to accumulate water derived from vapors contained in the respiratory gas.

8. The adaptor as set forth in claim 7, wherein:
   each of the reservoirs is provided between the at least one of the holes and the reservoir wall.

9. The adaptor as set forth in claim 7, further comprising:
   a plurality of first joint pipes, each of which is communicated with at least one of the holes and adapted to be coupled with an external tube, the first joint pipes extending in an axial direction of the tubular body.

10. The adaptor as set forth in claim 9, further comprising:
    a second passage, adapted to lead out the respiratory gas having a first end projected from an inner wall of the tubular body and a second end projected from an outer wall of the tubular body; and
    a second joint pipe, communicated with the second passage and adapted to be coupled with an external tube, the second joint pipe extending in an axial direction of the tubular body.

11. The adaptor as set forth in claim 9, further comprising:
    a connector, attached to the tubular body and having a body monolithic with the first joint pipes.

12. The adaptor as set forth in claim 10, further comprising:
    a connector, attached to the tubular body and having a body monolithic with the first joint pipes and the second joint pipe.

13. The adaptor as set forth in claim 1, further comprising:
a ridge, formed on the inner wall of the tubular body so as to be continued from the first end of the second passage and extended in an axial direction of the tubular body, wherein:
an end of the ridge in the axial direction of the tubular body and the first end of the second passage have the same shape.

14. The adaptor as set forth in claim 7, further comprising:
walls, each of which surrounds one of the holes, wherein:
a top end of each of the walls is higher than a bottom of each of the reservoirs.

15. A connector, comprising:
a body, adapted to be attached to a tubular body of an adaptor for a flow sensor;
a plurality of first joint pipes, each of which is adapted to be coupled with an external tube, and communicated, when the connector is attached to the tubular body, with at least one of holes each of which is formed on the tubular body and communicated with at least one of first passages formed in a fluid-resistant member disposed in the tubular body for leading out pressures at two positions in the tubular body, wherein:
the first joint pipes extend in an axial direction of the tubular body when the connector is attached to the tubular body; and
the body and the first joint pipes are monolithic.

16. The connector as set forth in claim 15, further comprising:
a second joint pipe, adapted to be coupled with an external tube, and communicated, when the connector is attached to the tubular body, with a second passage provided with the tubular body for leading out respiratory gas, wherein:
the second joint pipe extends in the axial direction of the tubular body when the connector is attached to the tubular body; and
the body and the second joint pipe are monolithic.

* * * * *